(12) United States Patent
Tokunaga et al.

(10) Patent No.: US 10,196,038 B2
(45) Date of Patent: Feb. 5, 2019

(54) VEHICULAR COMMUNICATION CONTROL SYSTEM

(71) Applicant: DENSO CORPORATION, Kariya, Aichi-pref. (JP)

(72) Inventors: Yuuki Tokunaga, Kariya (JP); Yuuji Mori, Kariya (JP)

(73) Assignee: DENSO CORPORATION, Kariya, Aich-pref. (JP)

( * ) Notice: Subject to any disclaimer, the term of this patent is extended or adjusted under 35 U.S.C. 154(b) by 65 days.

(21) Appl. No.: 15/110,806

(22) PCT Filed: Dec. 26, 2014

(86) PCT No.: PCT/JP2014/006478
§ 371 (c)(1),
(2) Date: Jul. 11, 2016

(87) PCT Pub. No.: WO2015/107609
PCT Pub. Date: Jul. 23, 2015

(65) Prior Publication Data
US 2016/0332597 A1 Nov. 17, 2016

(30) Foreign Application Priority Data

Jan. 15, 2014 (JP) .................................. 2014-005076

(51) Int. Cl.
| | |
|---|---|
| *B60R 25/24* | (2013.01) |
| *G07C 9/00* | (2006.01) |
| *G08C 17/02* | (2006.01) |
| *G08C 25/02* | (2006.01) |

(52) U.S. Cl.
CPC .......... *B60R 25/24* (2013.01); *G07C 9/00309* (2013.01); *G08C 17/02* (2013.01);
(Continued)

(58) Field of Classification Search
None
See application file for complete search history.

(56) References Cited

U.S. PATENT DOCUMENTS

| | | |
|---|---|---|
| 2003/0001723 A1 | 1/2003 | Masudaya |
| 2004/0042541 A1 | 3/2004 | Matsumura |

(Continued)

FOREIGN PATENT DOCUMENTS

| | | |
|---|---|---|
| JP | H11352987 A | 12/1999 |
| JP | 2003013644 A | 1/2003 |

(Continued)

*Primary Examiner* — Daniell L Negron
(74) *Attorney, Agent, or Firm* — Harness, Dickey & Pierce, P.L.C.

(57) ABSTRACT

A control system includes a vehicular device equipped to a vehicle and a portable device carried by a user. The vehicular device transmits, at a first transmission time interval, an RF signal in synchronization with an RF clock signal after a transmission of an LF signal. The portable device counts a reception time interval of the RF signal and determines, based on the reception time interval, a second transmission time interval of a response signal, and transmits the response signal at the second transmission time interval. The vehicular device further determines whether a duration time from transmission of the LF signal or the RF signal to reception of the response signal is within an appropriate range set based on the RF clock signal, and permits a predetermined manipulation to the vehicle when the duration time is within the appropriate range.

4 Claims, 7 Drawing Sheets

(52) U.S. Cl.
CPC ... *G08C 25/02* (2013.01); *G07C 2009/00333* (2013.01); *G07C 2009/00555* (2013.01); *G07C 2009/00769* (2013.01)

(56) References Cited

U.S. PATENT DOCUMENTS

| | | |
|---|---|---|
| 2004/0130457 A1 | 7/2004 | Ueda et al. |
| 2007/0026893 A1 | 2/2007 | Sakamoto et al. |
| 2012/0085197 A1 | 4/2012 | Mizushima |
| 2012/0105198 A1 | 5/2012 | Nakashima et al. |

FOREIGN PATENT DOCUMENTS

| | | |
|---|---|---|
| JP | 2003338771 A | 11/2003 |
| JP | 2004131935 A | 4/2004 |
| JP | 2005128746 A | 5/2005 |
| JP | 2007219207 A | 8/2007 |
| JP | 2008309966 A | 12/2008 |
| JP | 2011208463 A | 10/2011 |
| JP | 2012021318 A | 2/2012 |
| JP | 2012036582 A | 2/2012 |
| JP | 2012051421 A | 3/2012 |
| JP | 2012052361 A | 3/2012 |
| JP | 2012054662 A | 3/2012 |
| JP | 2012056343 A | 3/2012 |
| JP | 2012060482 A | 3/2012 |
| JP | 2012062651 A | 3/2012 |
| JP | 2012067500 A | 4/2012 |
| JP | 2012081783 A | 4/2012 |
| JP | 2012093867 A | 5/2012 |
| JP | 2012144844 A | 8/2012 |
| JP | 2012237103 A | 12/2012 |
| JP | 2014150425 A | 8/2014 |

| LAST TWO BITS OF Challenge 1/2 | MAGNITUDE RELATIONSHIP BETWEEN RECEPTION SIGNAL STRENGTHS |
|---|---|
| 1 0 | Challenge 1/2 > Challenge 2/2 |
| 1 1 | Challenge 1/2 = Challenge 2/2 |
| 0 1 | Challenge 1/2 < Challenge 2/2 |
| 0 0 | Challenge 1/2 = Challenge 2/2 |

VEHICULAR COMMUNICATION CONTROL SYSTEM

CROSS REFERENCE TO RELATED APPLICATION

This application is a U.S. National Phase Application under 35 U.S.C. 371 of International Application No. PCT/JP2014/006478 filed on Dec. 26, 2014 and published in Japanese as WO 2015/107609 A1 on Jul. 23, 2015. This application is based on and claims the benefit of priority from Japanese Patent Application No. 2014-005076 filed on Jan. 15, 2014. The entire disclosures of all of the above applications are incorporated herein by reference.

TECHNICAL FIELD

The present disclosure relates to a control system including a vehicular device equipped to a vehicle and a portable device carried by a user.

BACKGROUND ART

A conventional smart system includes a vehicular device equipped to a vehicle and a portable device carried by a user. The vehicular device transmits an LF-band LF signal of approximately 100 kilohertz to the portable device. The LF signal contains a wake code to instruct activation and a challenge code for authentication. The portable device transmits an RF-band response signal of ten to several tens of megahertz to the vehicular device in response to reception of the LF signal. The response signal is encrypted using the challenge code. The vehicular device verifies whether or not the response signal is transmitted from an authenticated portable device. When the verification result is normal, the smart system provides control to unlock a vehicle door or permits to start a vehicle engine.

In the above-described smart system, as illustrated in FIG. 8, repeaters A and B may be placed near the vehicle and the portable device, respectively. The repeaters A and B may enable the smart system to perform communication between the vehicular device and the portable device. In this configuration, there remains controversy over a relay attack technique that enables to provide control over unlocking the vehicle door or start the vehicle engine even though the vehicle and the portable device are distant from each other.

A technology to solve this issue controls a vehicular device equipped to a vehicle to transmit an LF-band LF signal containing a WAKE UP code (Wake) and a vehicle authentication code. The technology counts a delay time that occurs when receiving a response signal transmitted from a portable device in response to reception of the LF signal. The technology identifies the possibility of a relay attack using a repeater when the delay time exceeds an appropriate range. When the delay time exceeds the appropriate range, the technology inhibits control over unlocking the vehicle door or permission to start the vehicle engine (e.g., see patent literature 1).

As illustrated in FIG. 9, when transmitting the challenge code and the wake code from the vehicular device to the portable device, the apparatus described in patent literature 1 uses LF-band signal same as the wake code and also uses LF-band signal as the challenge code. In the configuration that uses an LF-band signal for the challenge code transmitted from the vehicular device to the portable device, a delay of several tens of microseconds and a clock variation may occur when the portable device demodulates the LF-band challenge code, for example. There is no alternative but to rely on the accuracy comparable to several tens of microseconds in order to count the time period from when the vehicular device transmits the wake code or the challenge code to the portable device to when the vehicular device receives a response signal from the portable device. Thus, the detection of a relay attack based on the challenge code adopting the LF-band signal has a low accuracy.

PRIOR ART LITERATURE

Patent Literature

Patent Literature 1: JP 2012-56343 A

SUMMARY OF INVENTION

In view of the foregoing difficulties, it is an object of the present disclosure to provide a control system capable of more reliably preventing a relay attack.

According to an aspect of the present disclosure, a control system includes a vehicular device equipped to a vehicle and a portable device carried by a user. The vehicular device includes an RF signal transmitting unit transmitting, at a first transmission time interval, an RF signal in synchronization with an RF clock signal after a transmission of an LF signal. The RF clock signal has an RF-band frequency which is higher than a frequency of the LF signal and the first transmission time interval is set based on the RF clock signal. The portable device includes an RF transceiving unit receiving the RF signal, a transmission time interval determination unit, and a response signal transmitting unit. The transmission time interval determination unit counts a reception time interval of the RF signal received by the RF transceiving unit, and determines, based on the reception time interval, a second transmission time interval of a response signal to be transmitted in response to the RF signal that is received. The response signal transmitting unit controls the RF transceiving unit to transmit the response signal at the second transmission time interval determined by the transmission time interval determination unit. The vehicular device further includes a determination unit determining whether a duration time from a transmission of one of the LF signal or the RF signal to a reception of the response signal is within an appropriate range that is set based on the RF clock signal, and a permission unit permitting a predetermined manipulation to the vehicle when the determination unit determines that the duration time is within the appropriate range.

In the above control system, the vehicular device transmits, at a first transmission time interval, an RF signal in synchronization with an RF clock signal after a transmission of an LF signal. The RF clock signal has an RF-band frequency which is higher than a frequency of the LF signal and the first transmission time interval is set based on the RF clock signal. The portable device counts a reception time interval of the RF signal received by the RF transceiving unit which performs transceiving of the RF signal, and determines, based on the reception time interval, a second transmission time interval of a response signal to be transmitted in response to the RF signal that is received. Then, the portable device transmits the response signal at the second transmission time interval through the RF transceiving unit. The vehicular device determines whether a duration time from a transmission of one of the LF signal or the RF signal to a reception of the response signal is within an appropriate range that is set based on the RF clock signal. When, the duration time is determined to be within the appropriate range, the vehicular device permits a predetermined manipulation to the vehicle. With this configuration, a relay attack can be more reliably prevented than a configuration in which the portable device transmits a response signal to the vehicular device in response to reception of the LF-band LF signal.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Figure 1:
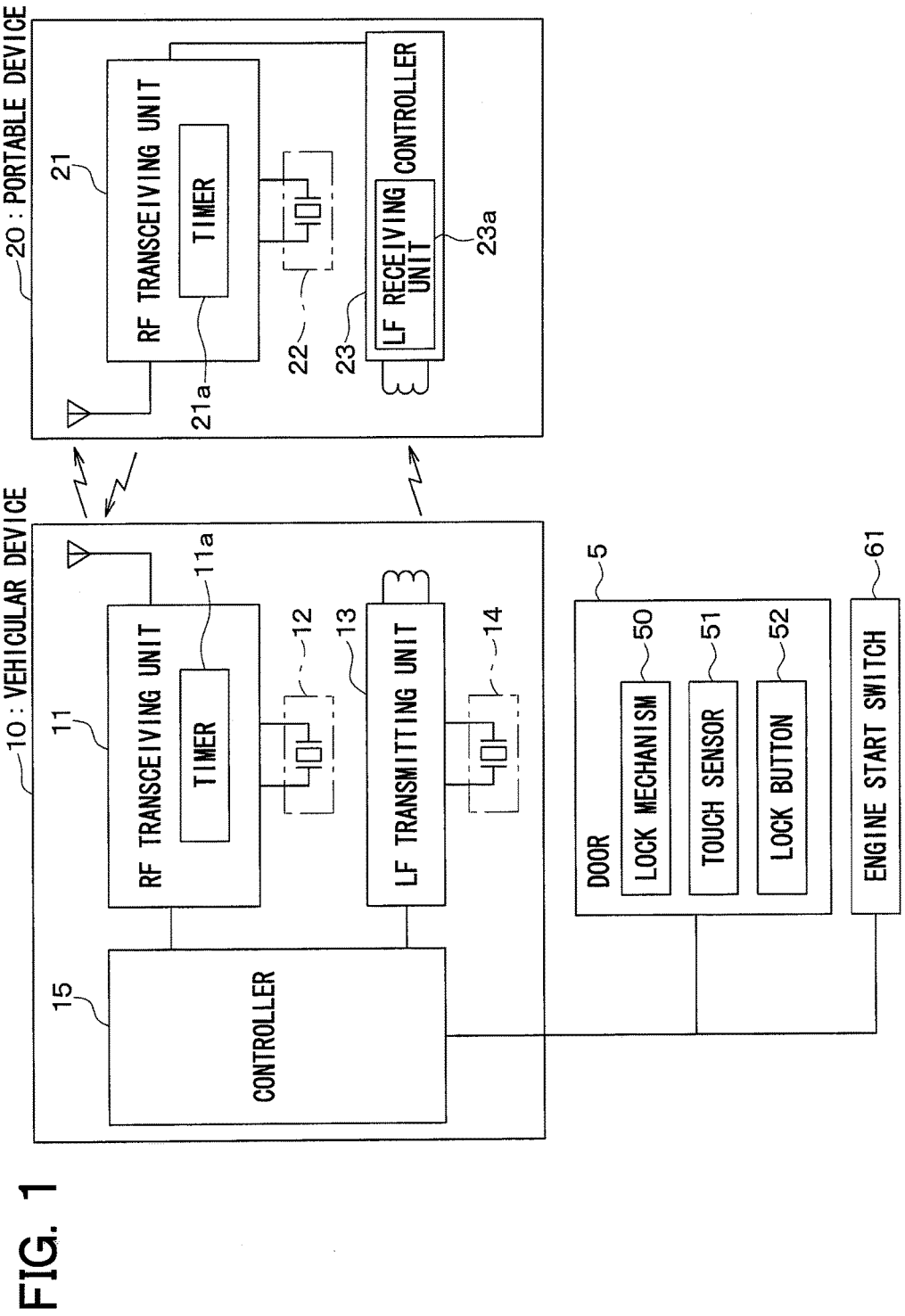
FIG. 1 is a diagram illustrating a control system according to a first embodiment of the present disclosure.

Embodiments of the present disclosure will be described with reference to the accompanying drawings. Hereinafter, the mutually equal or comparable parts in the following embodiments are designated by the same reference numerals.

First Embodiment

FIG. 1 illustrates a configuration of the control system according to a first embodiment of the present disclosure. The control system is configured as Smart Key System (registered trademark) including a vehicular device 10 equipped to a vehicle and a portable device 20 carried by a user. In the present disclosure, LF signifies a low frequency ranging from 30 to 300 kilohertz, and RF signifies a high frequency ranging from 10 to several tens of megahertz. The low frequency is also referred to as a first frequency and the high frequency is also referred to as a second frequency.

The vehicular device 10 includes an RF transceiving unit 11, a crystal oscillator 12, an LF transmitting unit 13, a crystal oscillator 14, and a controller 15.

The RF transceiving unit 11 is configured as a transceiver integrated circuit (IC) that implements an RF transmitting unit (not shown) to transmit an RF signal and an RF receiving unit (not shown) to receive an RF signal in a single chip. The RF transmitting unit and the RF receiving unit operate in synchronization with an RF-band RF clock signal, which is generated by the crystal oscillator 12 to have a constant frequency.

The RF transceiving unit 11 transmits an RF-band (ten to several tens of megahertz) signal from an antenna provided for the vehicle to the vicinity of the vehicle. The RF transceiving unit 11 also receives an RF-band (ten to several tens of megahertz) signal transmitted from the portable device 20. Specifically, the RF transceiving unit 11 transmits a challenge signal (corresponding to the RF signal) synchronized with the RF-band RF clock, and receives an RF-band response signal (corresponding to the response signal) transmitted from the portable device 20 in response to reception of the challenge signal.

The RF transceiving unit 11 includes a timer 11a which counts time based on an instruction from the controller 15. The timer 11a is configured by using a counter that performs the counting operation in synchronization with the RF clock signal generated by the crystal oscillator 12.

The LF transmitting unit 13 transmits an LF-band (30 to 300 kilohertz) wake code that forces the portable device 20 to wake up and start operation. The wake code is transmitted from an antenna provided for the vehicle. The LF transmitting unit 13 operates under a reference clock, namely, an LF-band LF clock signal, which is generated by the crystal oscillator 14 to have a constant frequency.

The controller 15 is configured as a computer including a CPU, RAM, ROM, flash memory, I/O interfaces and the like. The CPU performs various processes in accordance with a program stored in the ROM. The flash memory of the controller 15 stores a specified identification code assigned to the authenticated portable device 20.

The portable device 20 includes an RF transceiving unit 21 and a controller 23.

The RF transceiving unit 21 receives an RF-band (ten to several tens of megahertz) signal transmitted from the vehicular device 10 and transmits an RF-band (ten to several tens of megahertz) signal to the vehicular device 10. Specifically, the RF transceiving unit 21 receives an RF-band challenge signal transmitted from the vehicular device 10. In response to reception of the challenge signal, the RF transceiving unit 21 transmits an RF-band response signal to the vehicular device 10.

Similarly to the RF transceiving unit 11 mentioned above, the RF transceiving unit 21 of the portable device 20 is also configured as a transceiver IC that implements an RF transmitting unit (not shown) to transmit an RF-band RF signal and an RF receiving unit (not shown) to receive an RF signal on a single chip. The RF transmitting unit and the RF receiving unit operate in synchronization with an RF-band RF clock signal which is generated by the crystal oscillator 22 to have a constant frequency.

With the above-described configuration, bidirectional communication can be carried out between the RF transceiving unit 11 of the vehicular device 10 and the RF transceiving unit 21 of the portable device 20 with less time delay under strict transmission and reception time point condition.

The controller 23 is configured as a computer including a CPU, RAM, ROM, flash memory, I/O interfaces and the like. The CPU performs various processes in accordance with a program stored in the ROM. The flash memory of the controller 23 stores a specified identification code assigned to the portable device 20.

The controller 23 includes an LF receiving unit 23a that receives an LF-band (30 to 300 kilohertz) signal. The LF receiving unit 23a receives a wake code transmitted from the portable device 20. In response to the reception of wake code, the controller 23 is activated from a standby state and starts operation.

The vehicular device 10 transmits an LF-band wake code whose signal strength attenuates with an increase of communication range in order to limit a communication area of the vehicular device 10 to a specified area near the vehicle. Namely, the wake code contained in the LF signal is used to start the portable device 20 when the portable device 20 is available in the specified area near the vehicle. The portable device 20 is controlled to be inactive when the portable device 20 is unavailable in the specified area near the vehicle.

In the portable device 20, a power consumption required for an RF signal standby state to be prepared for receiving RF-band signals is high compared with a power consumption required for an LF signal standby state to be prepared for receiving LF-band signals.

A door 5 of the vehicle includes a lock mechanism 50, a touch sensor 51, and a lock button 52. The lock mechanism 50 locks or unlocks the door. The touch sensor 51 is attached to a door handle of the vehicle and detects that a user holds the door handle.

The lock button 52 corresponds to a door lock button used for Smart Key System and is attached near the door handle. When the verification outside a vehicle compartment succeeds, the user can press the lock button 52 to lock the door.

The door 5 represents a door set including several doors (such as a driver's door, a front passenger's door, a right rear seat door, and a left rear seat door) provided for the vehicle. Each of the doors may include the lock mechanism 50, the touch sensor 51, and the lock button 52.

The vehicle includes an engine start switch 61 near the driver's seat in the vehicle compartment. The engine start switch 61 corresponds to a switch to start the engine in a smart start system. When the verification inside a vehicle compartment is successful, the user can press the engine start switch 61 to start the engine. In-vehicle communication connects the above-mentioned components to each other and enables the above-mentioned information exchange.

Figure 2:
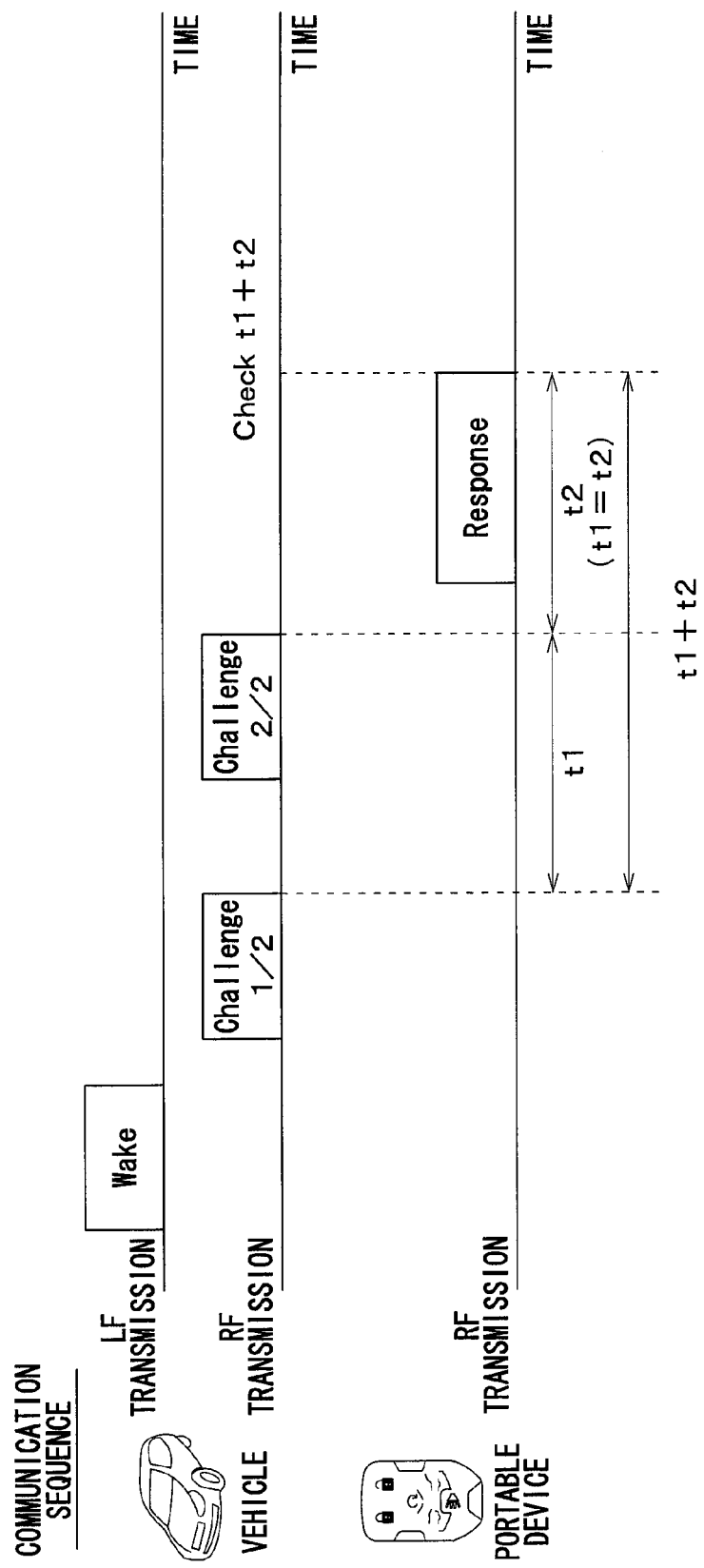
FIG. 2 is a diagram illustrating transmission time points of a wake code and a challenge signal, which are transmitted from a vehicle, and a transmission time point of a response signal which is transmitted from a portable device.

The touch sensor 51 detects the user's touch on the door handle in the Smart Key System. Then, as illustrated in FIG. 2, the vehicular device 10 at the vehicle side transmits an LF-band wake code (denoted as "Wake" in the drawing) to the vicinity of the vehicle. The portable device 20 receives this wake code and starts.

The Smart Key System according to the present embodiment aims at more reliably preventing a relay attack. For this purpose, the vehicular device 10 transmits the wake code and then transmits challenge signal (denoted as "Challenge" in the drawings) for verification purpose. The challenge signal is transmitted at a first transmission time interval (t1) determined based on an RF-band RF clock whose frequency is higher than an LF-band LF signal. Specifically, the vehicular device 10 transmits the challenge signal by dividing it into two segments, such as challenge signal 1/2 and challenge signal 2/2. At this time, the vehicular device 10 sequentially transmits the two challenge signal segments so that a time interval between a transmission completion of the first challenge signal 1/2 and a transmission completion of the second challenge signal 2/2 is equal to the first time interval t1.

The portable device 20 counts the first time interval t1 by counting a time interval from the completion of receiving the first challenge signal 1/2 to the completion of receiving the second challenge signal 2/2. The portable device 20 determines a transmission time point of the response signal so as to satisfy t1=t2. Herein, the time interval t2 is duration time from completion of receiving the second challenge signal 2/2 to completion of transmitting the response signal (denoted as "Response" in the drawing). The portable device 20 transmits the response signal to the vehicular device 10 at the transmission time point which satisfies t1=t2. The response signal contains a specified identification code assigned to the portable device 20.

In the present embodiment, a second time interval is defined as a period of t1+t2 ranging from completion of transmitting challenge signal 1/2 to completion of receiving the response signal in the vehicular device 10. The vehicular device 10 checks whether or not the second time interval t1+t2 is within an appropriate range preliminarily defined based on the RF clock. When the second time interval t1+t2 is within an appropriate range, the vehicular device 10 performs verification based on the specified identification code contained in the response signal. When the verification is successful, the vehicular device 10 performs control to unlock the vehicle door. A relay attack may occur when the second time interval t1+t2 ranging from completion of transmitting challenge signal 1/2 to completion of receiving the response signal exceeds the appropriate range. In this case, the vehicular device 10 inhibits control to unlock the vehicle door.

Figure 3:
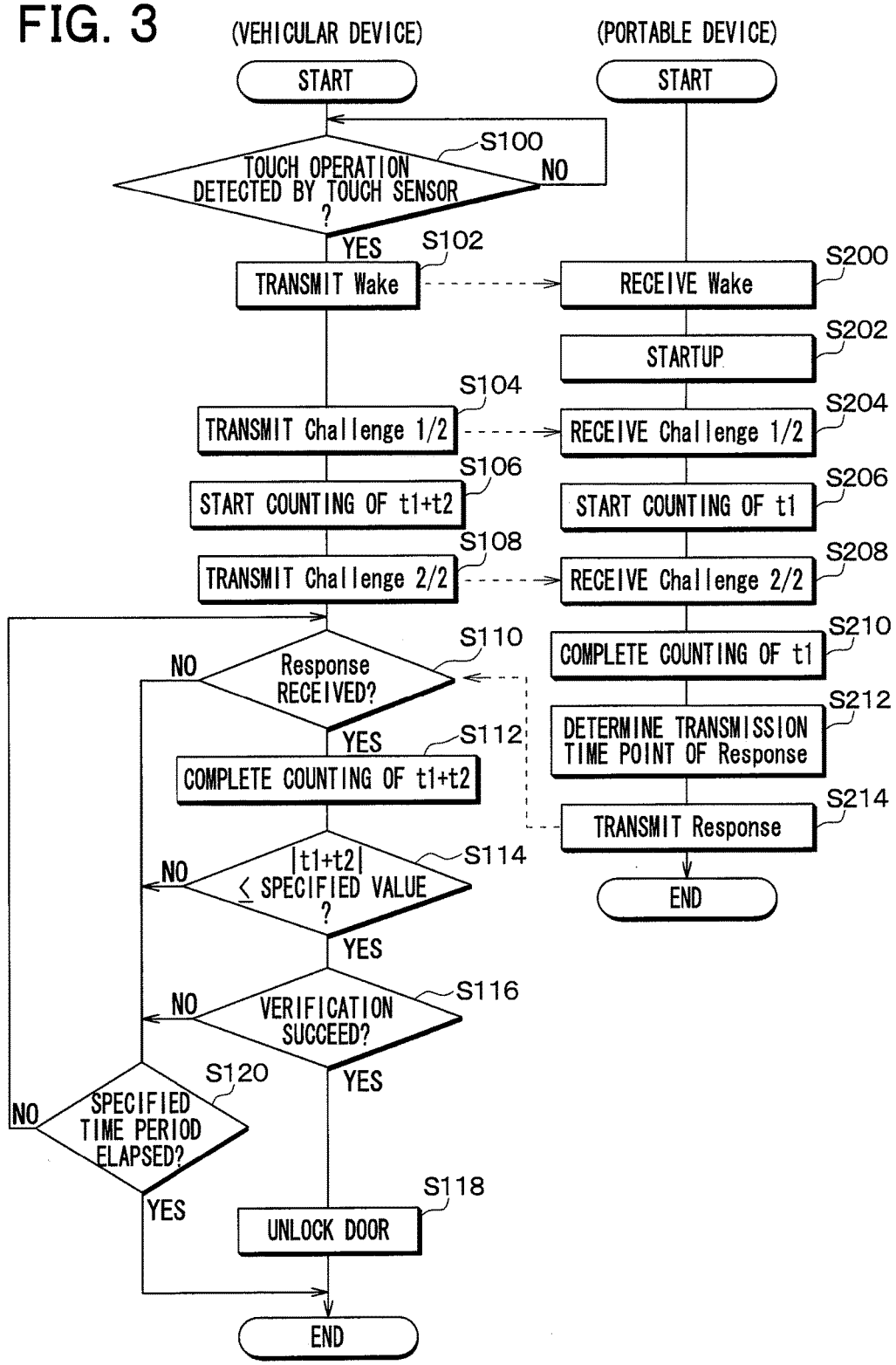
FIG. 3 is a flowchart illustrating processes executed by a controller of a vehicular device and a controller of a portable device according to the first embodiment.

The description below explains a process of the Smart Key System to prevent a relay attack from unlocking a door. FIG. 3 is a flowchart showing processes executed by the controller 15 of the vehicular device 10 and the controller 23 of the portable device 20. The controller 15 of the vehicular device 10 and the controller 23 of the portable device 20 each periodically perform the process in FIG. 3.

The controller 15 of the vehicular device 10 determines whether or not the touch sensor 51 detects the user's touch operation on the door handle (S100). The controller 15 repeats the determination at S100 until a touch on the door handle is detected.

The determination at S100 results in YES when the touch sensor 51 detects the user's touch operation on the door handle. Then, as illustrated in FIG. 2, the controller 15 controls the LF transmitting unit 13 to transmit an LF-band wake code toward the vicinity area of the vehicle (S102).

Suppose that a user carrying the portable device 20 exists near the vehicle and the LF receiving unit 23a of the portable device 20 receives the wake code (S200). In this case, the controller 23 of the portable device 20 deactivates the standby state and is started (S202).

After a predetermined time elapsed from transmission of the wake code, the controller 15 of the vehicular device 10 controls the RF transceiving unit 11 to transmit challenge signal 1/2 containing the challenge code (S104). The controller 15 starts counting the time interval t1+t2 as illustrated in FIG. 2 (S106). Specifically, the controller 15 of the vehicular device 10 instructs the timer 11a to count elapsed time period from completion of transmitting challenge signal 1/2. In response to this instruction, the timer 11a starts counting of the elapsed time from completion of transmitting challenge signal 1/2.

The controller 23 of the portable device 20 controls the RF transceiving unit 21 to receive challenge signal 1/2 (S204), and right after the reception of the challenge signal 1/2, the controller 23 starts counting the first time interval t1 (S206). Specifically, the controller 23 of the portable device 20 instructs the timer 21a of the RF transceiving unit 21 to start counting the time from completion of receiving challenge signal 1/2. In response to this instruction, the timer 21a starts counting the elapsed time from completion of receiving challenge signal 1/2.

After a predetermined time elapsed from transmission of challenge signal 1/2, the controller 15 of the vehicular device 10 transmits challenge signal 2/2 (S108). Specifically, the controller 15 transmits challenge signal 2/2 so that a time interval from completion of transmitting challenge signal 1/2 to completion of transmitting second challenge signal 2/2 equals first time interval t1, which is counted by the timer 11a as illustrated in FIG. 2.

The controller 15 determines whether or not to have received the response signal transmitted from the portable device 20 (S110). Specifically, the controller 15 determines whether or not the RF transceiving unit 11 receives the response signal from the portable device 20.

The controller 23 of the portable device 20 controls the RF transceiving unit 21 to receive challenge signal 2/2 (S208) and complete the counting of constant time interval t1 (S210). Specifically, the controller 23 instructs the timer 21a to terminate the time counting when reception of the challenge signal 2/2 is completed. In response to this instruction, the timer 21a terminates the time counting when reception of the challenge signal 2/2 is completed.

The controller 23 determines the time point to transmit the response signal (S212). As illustrated in FIG. 2, the controller 23 determines the time point to transmit the response signal so that time interval t2 from completion of receiving challenge signal 2/2 to completion of transmitting the response signal equals first time interval t1 counted by the timer 21a.

The controller 23 controls the RF transceiving unit 21 to transmit the response signal at the transmission time point determined at S212 (S214), and then terminates the process.

When the controller 15 of the vehicular device 10 determines NO at S110, that is, when the RF transceiving unit 11 of the vehicular device 10 has not received the response signal from the portable device 20, the controller 15 of the vehicular device 10 determines whether or not a specified time period has elapsed after completion of transmitting challenge signal 1/2 (S120). The determination at S120 results in NO when a specified time period has not elapsed after completion of transmitting challenge signal 1/2. In this case, the controller 15 returns to the determination at S110.

The controller 15 completes the counting of second time interval t1+t2 (S112) when the RF transceiving unit 11 receives the response signal from the portable device 20 before a specified time period elapses from completion of transmitting challenge signal 1/2. Specifically, the controller 15 instructs the timer 11a to terminate the time counting. The timer 11a terminates the time counting in response to this instruction.

The controller 15 determines whether or not second time interval t1+t2 is within an appropriate range (S114). The embodiment determines that second time interval t1+t2 is within an appropriate range when second time interval t1+t2 counted by the timer 11a is within a specified value t1×2+α (herein, α indicates an error).

In the present embodiment, the RF transceiving unit 11 of the vehicular device 10 and the RF transceiving unit 21 of the portable device 20 each operates in synchronization with an RF-band RF clock signal. Further, a determination is carried out to determine whether the second time interval t1+t2 is within an appropriate range or not.

The determination at S114 results in YES when second time interval t1+t2 counted by the timer 11a is within the specified value t1×2+α (α is an error). The flash memory of the controller 15 stores the specified identification code for the authenticated portable device 20. The controller 15 performs verification by comparing this specified identification code with the specified identification code contained in the response signal and determines whether or not the verification is successful (S118).

The determination at S116 results in YES when the verification is succeeded. In this case, the controller 15 performs control to unlock the door 5 of the vehicle (S118) and terminates the process.

The determination at S116 results in NO when the portable device 20 is not authenticated and the verification is unsuccessful. In this case, the controller 15 terminates the process without performing control to unlock the door 5 of the vehicle.

In some cases, a repeater may be placed between the vicinity of the vehicle and the vicinity of the portable device for performing a relay attack. In such a case, a delay occurs between the time when the vehicular device 10 transmits challenge signal 1/2 to the portable device 20 and the time when the vehicular device 10 receives a response signal from the portable device 20. At S112, second time interval t1+t2 counted by the timer 11a is larger than specified value t1×2+α (α is an error). Therefore, the determination at S114 results in NO. The determination at S120 results in YES when a specified time period elapses from completion of transmitting challenge signal 1/2. In this case, the controller 15 terminates the process without performing control to unlock the door 5 of the vehicle.

According to the above-mentioned configuration, the vehicular device 10 transmits an LF-band wake code first, and then transmits a challenge signal synchronized with an RF-band RF clock by dividing the challenge signal into two or more segments. The two or more segments of the challenge signal are transmitted at a first transmission time interval t1 determined based on the RF clock. The frequency of the RF clock is higher than the wake code. The portable device 20 controls the RF transceiving unit 21 to count the reception time interval t1 of the challenge signal. The RF transceiving unit 21 transmits and receives RF-band signals. The portable device 20 determines the second transmission time interval of a response signal to be transmitted in response to the reception of the challenge signal based on the reception time interval. The portable device 20 controls the RF transceiving unit to transmit the response signal at the second transmission time point. The vehicular device 10 determines whether or not time interval t1+t2 from transmission completion of the challenge signal to reception completion of the response signal is within an appropriate range determined based on the RF clock. The vehicular device 10 permits predetermined manipulation to the vehicle when time interval t1+t2 is determined to fall within an appropriate range determined based on the RF clock. With this configuration, a relay attack can be more reliably prevented than a configuration in which the portable device 20 transmits a response signal to the vehicular device in response to reception of an LF-band challenge signal.

The vehicular device 10 divides the challenge signal into several segments. The vehicular device 10 sequentially transmits the divided challenge signal segments at constant time interval t1 determined based on the RF clock. The portable device 20 controls the RF transceiving unit 21 to receive the challenge signal and counts the constant time interval between two adjacent challenge signal segments. The portable device 20 can determine the time point to transmit a response signal to be transmitted in response to reception of the challenge signal based on the constant time interval of the challenge signal segments. Each of the divided segments of the challenge signal is hereinafter also referred to as a signal segment.

The RF transceiving unit 21 is configured as a transceiver IC that implements an RF transmitting unit to transmit an RF signal and an RF receiving unit to receive an RF signal on a single chip. The RF transmitting unit and the RF receiving unit operate in synchronization with an RF-band RF clock signal generated by the crystal oscillator 22. This enables to decrease the delay time that occurs from the time when the portable device 20 receives the RF signal to the time when the portable device 20 transmits a response signal.

Second Embodiment

Figure 4:
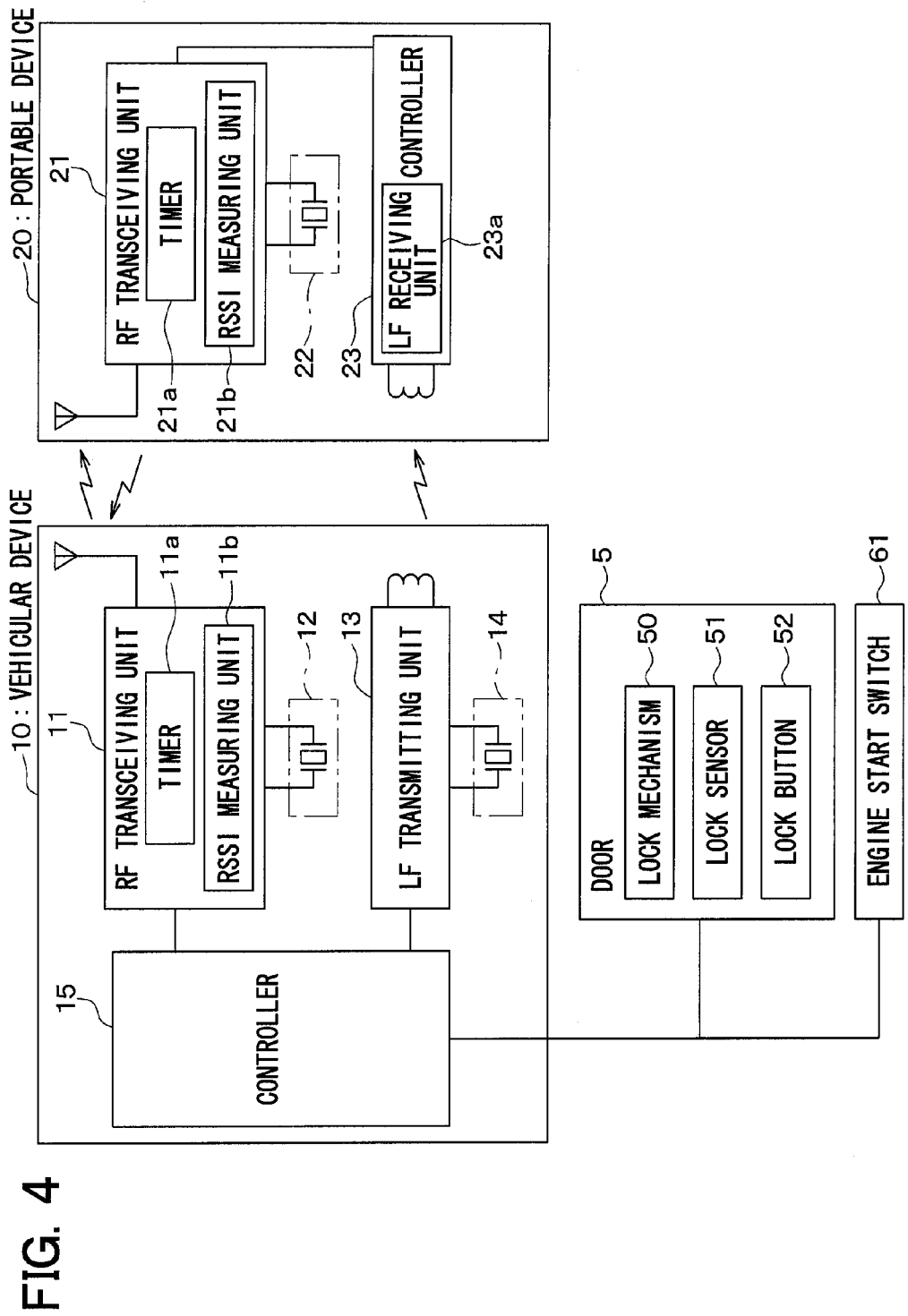
FIG. 4 is a diagram illustrating a configuration of a control system according to second and third embodiments of the present disclosure.

FIG. 4 illustrates a configuration of a control system according to a second embodiment of the present disclosure. The control system according to the present embodiment differs from the configuration illustrated in FIG. 1 in that the RF transceiving unit of the vehicular device 10 includes an RSSI measuring unit 11b, and the RF transceiving unit 21 of the portable device 20 includes an RSSI measuring unit 21b.

The RSSI measuring unit 11b measures received signal strength (RSSI) of the response signal transmitted from the portable device 20 and outputs a signal indicating the received signal strength (RSSI) to the controller 15.

The RSSI measuring unit 21b measures received signal strength (RSSI) of the challenge signal transmitted from the vehicular device 10 and outputs a signal indicating the received signal strength (RSSI) to the controller 23.

The control system according to the first embodiment is configured so that the vehicular device 10 transmits RF-band challenge signals 1/2 and 2/2 to the portable device 20 each using the constant radio field strength. The control system according to the second embodiment enables the RF transceiving unit 11 of the vehicular device 10 to change the radio field strength of a transmission signal in stepwise manner according to an instruction from the controller 15. The control system changes the transmission strength of RF-band challenge signals 1/2 and 2/2 transmitted from the vehicular device 10 to the portable device 20 at two levels, namely, a high level and a low level.

The controller 15 of the vehicular device 10 may control last two bits of challenge signal 1/2 to contain information indicating the magnitude relationship between transmission strengths of challenge signals 1/2 and 2/2.

Figures 5, 6:
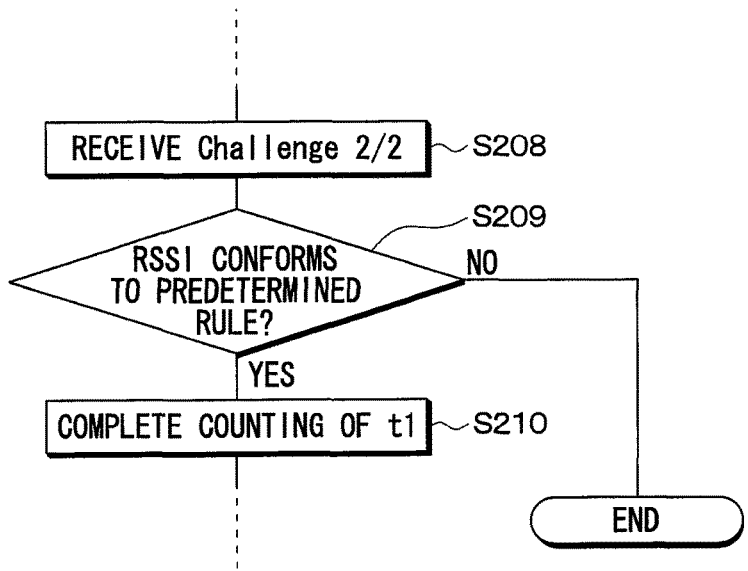
FIG. 5 is a diagram illustrating received signal strength of each challenge signal in the control system according to the second embodiment of the present disclosure.
FIG. 6 is a flowchart illustrating a process executed by a controller of the portable device according to the second embodiment.

FIG. 5 illustrates last two bits of challenge signal 1/2 and the magnitude relationship between transmission strengths of challenge signals 1/2 and 2/2 indicated by the last two bits of the challenge signal 1/2.

The controller 15 of the vehicular device 10 sets the last two bits of challenge signal 1/2 to "1, 0" when transmitting challenge signal 1/2 at the high level and challenge signal 2/2 at the low level. The controller 15 of the same sets the last two bits of challenge signal 1/2 to "0, 1" when transmitting challenge signal 1/2 at the low level and challenge signal 2/2 at the high level.

The controller 15 of the vehicular device 10 sets the last two bits of challenge signal 1/2 to "1, 1" when transmitting challenge signals 1/2 and 2/2 each at the high level. The controller 15 of the same sets the last two bits of challenge signal 1/2 to "0, 0" when transmitting challenge signals 1/2 and 2/2 each at the low level.

Combinations of transmission levels for challenge signals 1/2 and 2/2 may be determined randomly or according to certain rules.

When receiving challenge signals 1/2 and 2/2, the RF transceiving unit 21 of the portable device 20 controls the RSSI measuring unit 21b to measure received signal strengths of challenge signals 1/2 and 2/2.

Specifically, when receiving challenge signal 1/2 at S204 in FIG. 3, the controller 23 controls the RSSI measuring unit 21b to measure the received signal strength of challenge signal 1/2. Thereafter, at S206, the controller 23 starts counting of the first time interval t1. When receiving challenge signal 2/2 at S208, the controller 23 controls the RSSI measuring unit 21b to measure the received signal strength of challenge signal 2/2.

According to the present embodiment, the controller 23 of the portable device 20 receives challenge signal 2/2 at S208. Thereafter, as illustrated in FIG. 6, the controller 23 determines whether or not the received signal strengths (RSSI) satisfy a predetermined rule (S209). Specifically, the controller 23 determines whether or not the received signal strength of each challenge signal received by the portable device 20 satisfies a predetermined rule, based on the received signal strength of each challenge signal measured by the RSSI measuring unit 21b and the last two bits of challenge signal 1/2.

The determination at S209 results in YES when the received signal strength (RSSI) satisfies a predetermined rule. The controller 23 proceeds to S210 to complete counting of the first time interval t1 and continues the process of transmitting the response signal corresponding to the challenge signal.

The received signal strength (RSSI) of each challenge signal received by the portable device 20 may not satisfy a predetermined rule when a repeater is placed between the vicinity of the vehicle and the vicinity of the portable device and repeats signals for performing a relay attack. In this case, the determination at S209 results in NO. Then, the controller 23 terminates the process without continuing the process of transmitting the response signal.

As described above, the vehicular device 10 changes transmission strengths of the RF signals in stepwise manner. The vehicular device 10 transmits the RF signals by controlling them to contain the information indicating the transmission strength relationship of the RF signals. The portable device 20 includes the RSSI measuring unit 21b that measures received signal strengths of several RF signals received by the RF transceiving unit 21. The portable device 20 determines whether or not received signal strengths of several challenge signals received by the RF transceiving unit 21 satisfy a predetermined relationship condition corresponding to the information indicating transmission strength relationship of the RF signals, based on information indicating received signal strength relationship of the challenge signals measured by the RSSI measuring unit 21b and measured transmission strengths of the RF signals contained in the challenge signals. The portable device 20 can prevent transmission of a response signal when received signal strengths of the RF signals received by the RF transceiving unit 21 do not satisfy a predetermined rule, that is, a predetermined relationship condition.

Third Embodiment

The second embodiment is configured to change the transmission strength of each RF-band challenge signal transmitted from the vehicular device 10 to the portable device 20 in stepwise manner and determine whether or not the received signal strength (RSSI) of each challenge signal satisfies a predetermined rule. The control system according to the third embodiment changes the transmission strength of each RF-band challenge signal transmitted from the vehicular device 10 to the portable device 20 in stepwise manner, and then, changes the transmission strength of a response signal transmitted from the portable device 20 to the vehicular device 10 in stepwise manner in accordance with the transmission strength relationship of the RF-band challenge signals transmitted from the vehicular device 10 to the portable device 20.

The RF transceiving unit 21 of the portable device 20 according to the present embodiment controls the RSSI measuring unit 21b to measure the received signal strength of each challenge signal 1/2 and 2/2 when receiving each challenge signal 1/2 and 2/2.

Specifically, the controller 23 controls the RSSI measuring unit 21b to measure the received signal strength of challenge signal 1/2 when receiving challenge signal 1/2 at S204 in FIG. 3. At S206, the controller 23 starts counting of the first time interval t1. Further, the controller 23 controls the RSSI measuring unit 21b to measure the received signal strength of challenge signal 2/2 when receiving challenge signal 2/2 at S208.

Figure 7:
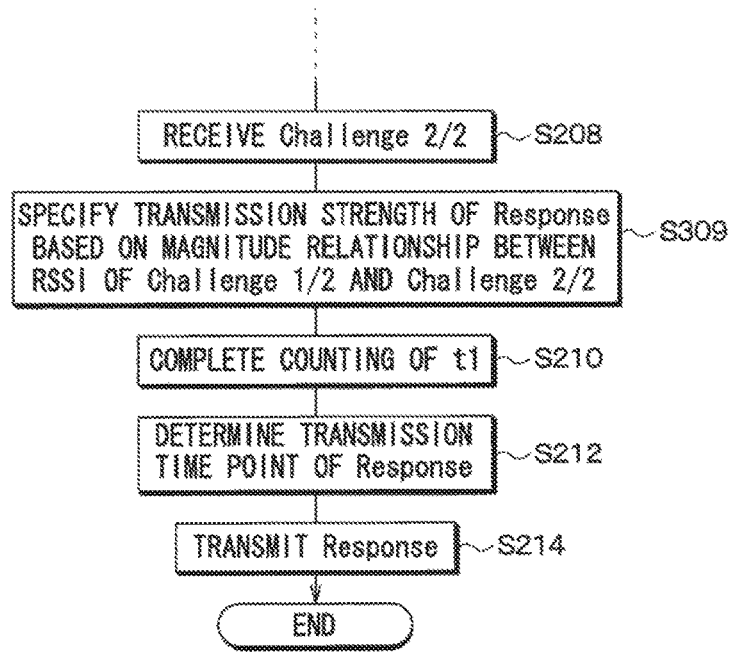
FIG. 7 is a flowchart illustrating a process executed by a controller of the portable device according to the third embodiment.
Figure 8:
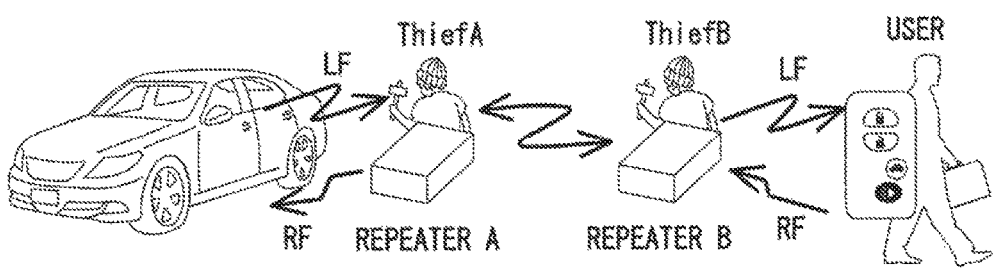
FIG. 8 is a diagram illustrating a relay attack.
Figure 9:
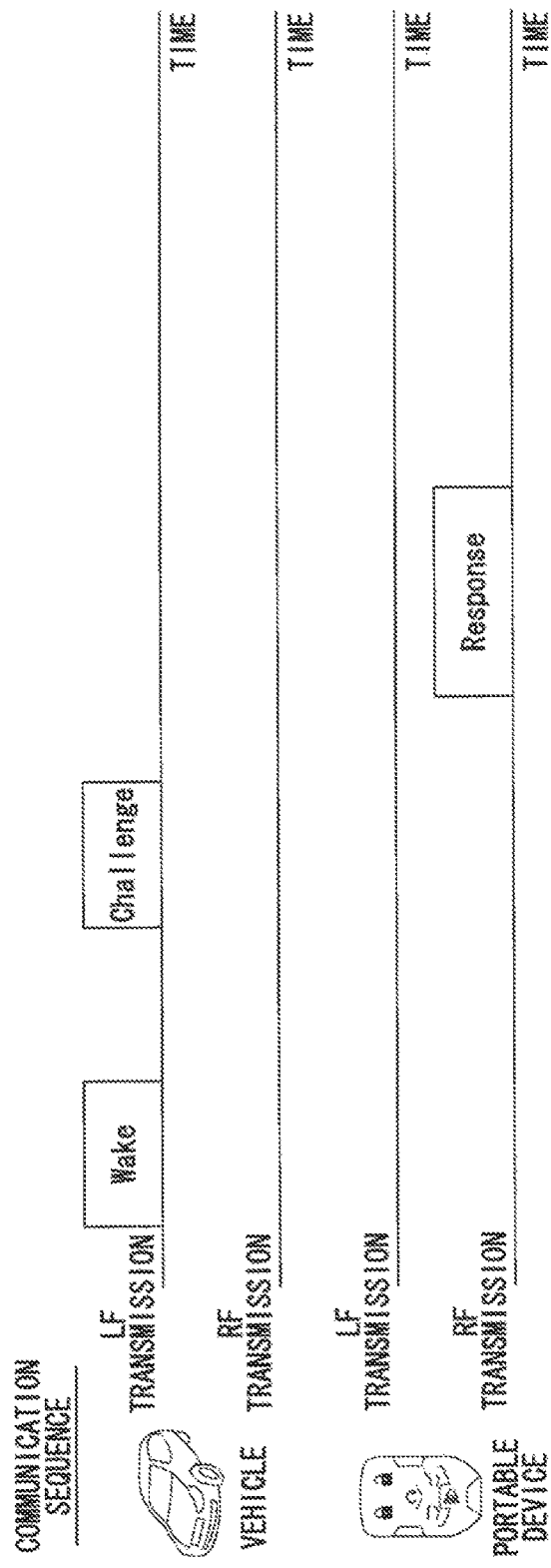
FIG. 9 is a diagram illustrating a problem to be solved by the present disclosure.

According to the present embodiment, the controller 23 of the portable device 20 receives challenge signal 2/2 at S208. The controller 23 then determines the transmission strength of a response signal (S309) based on the magnitude relationship between received signal strengths of challenge signals 1/2 and 2/2 as illustrated in FIG. 7. For example, the controller 23 sets the transmission strength of the response signal to have a high level when a reception level of challenge signal 1/2 equals a reception level of challenge signal 2/2. For example, the controller 23 sets the transmission strength of the response signal to have a low level when a reception level of challenge signal 1/2 differs from a reception level of challenge signal 2/2.

At S210, the controller 23 completes counting of the first time interval t1. At S212, the controller 23 determines transmission time point of the response signal. At S214, the controller 23 transmits the response signal using the transmission strength specified at S309.

At S110 in FIG. 3, the controller 15 of the vehicular device 10 determines whether or not the response signal is received normally. In S110 of the present embodiment, when receiving the response signal, the RF transceiving unit 11 of the vehicular device 10 controls the RSSI measuring unit 11b to measure the received signal strength of the response signal. The RF transceiving unit 11 determines whether or not the response signal is received normally, based on the RSSI measurement result. The controller 15 can determine whether or not the response signal is received normally, based on a rule defining that the response signal is transmitted at a high level when challenge signals 1/2 and 2/2 are transmitted to the portable device 20 at the same level and that the response signal is transmitted at a low level when challenge signals 1/2 and 2/2 are transmitted to the portable device 20 at different levels.

The determination at S110 results in YES when the received signal strength (RSSI) of the challenge signal satisfies a predetermined rule. The controller 23 proceeds to S112.

The received signal strength (RSSI) of the response signal received by the vehicular device 10 does not satisfy a predetermined rule when a repeater is placed between the vicinity of the vehicle and the vicinity of the portable device and repeats signals for performing a relay attack. In this case, the determination at S110 results in NO. Then, the determination at S120 results in YES when a specified time period elapses from completion of transmitting challenge signal 1/2. In this case, the controller 15 terminates the process without performing control to unlock the door 5 of the vehicle.

As described above, the vehicular device 10 changes the transmission strengths of several RF signals in stepwise manner and transmits the RF signals by controlling them to contain the information indicating the transmission strength relationship of the RF signals. The portable device 20 includes the RSSI measuring unit 21b that measures received signal strengths of several RF signals received by the RF transceiving unit 21. The portable device 20 determines the transmission strength of a response signal based on received signal strengths of several RF signals measured by the RSSI measuring unit 21b and transmits a response signal at the determined transmission strength. The vehicular device 10 includes the RSSI measuring unit 11b to measure the received signal strength of the response signal. A permission unit of the vehicular device 10 may forbid certain manipulations to the vehicle when the received signal strength of the response signal measured by the RSSI measuring unit 11b does not satisfy a predetermined rule corresponding to the information indicating transmission strengths of the RF signals.

The present disclosure is not limited to the above-mentioned embodiments and may be variously modified within the spirit and scope of the disclosure, as will be described below.

In the foregoing embodiments, a control process to prevent a relay attack for unlocking a door in the Smart Key System is described as an example. As another example, the present disclosure may be applied to a control process for preventing a relay attack for starting a vehicle engine, or to a control process for preventing a relay attack for starting a traction motor equipped to an electric vehicle, or to a control process for preventing a relay attack for unlocking a door of a vehicle.

According to the above-mentioned first through third embodiments, the challenge signal is divided into two segments, namely challenge signals 1/2 and 2/2. After completing transmission of challenge signal 1/2, the vehicular device 10 sequentially transmits the challenge signals, and sets a time period from the transmission completion of the first challenge signal 1/2 to the transmission completion of the second challenge signal 2/2 as the first time interval t1. The disclosure is not limited to this configuration. For example, the vehicular device 10 may sequentially transmit the challenge signals, and set time period from the transmission start of the challenge signal 1/2 to the transmission start of the second challenge signal 2/2 as the first time interval t1. In another example, the challenge signal may be divided into three or more segments, in addition to two segments. The vehicular device 10 may count a time interval between at least two of the divided challenge signals as first time interval t1.

As illustrated in FIG. 2, the first through third embodiments are configured so that the first time interval t1 counted from the transmission completion of the challenge signal 1/2 to the transmission completion of the challenge signal 2/2 equals the second time interval t2 counted from the transmission completion of the challenge signal 2/2 to the transmission completion of the response signal. The disclosure is not limited to this example. Specifically, transmission time point of the challenge signal transmitted from the vehicular device 10 and transmission time point of the response signal transmitted from the portable device 20 may be determined based on the time points defined by an RF-band signal. In such a case, transmission time points other than those used in the foregoing embodiments can be used for the challenge signal transmitted from the vehicular device 10 and the response signal transmitted from the portable device 20.

The first through third embodiments provide the configuration that duration from the transmission completion of the challenge signal 1/2 to the reception completion of the response signal is counted as the second time interval (t1+t2). The disclosure is not limited to this configuration. For example, the disclosure may be configured to count a time interval from transmission completion of the wake code to reception completion of the response signal as the second time interval.

In the second embodiment, the controller 15 of the vehicular device 10 includes information indicating the magnitude relationship between challenge signals 1/2 and 2/2 in last two bits of challenge signal 1/2. The information indicating the magnitude relationship can be also included in other bits of the challenge signal except the last two bits.

The second embodiment provides the configuration in which the transmission strength of RF-band challenge signals 1/2 and 2/2 transmitted from the vehicular device 10 to the portable device 20 change between two levels, namely, a high level and a low level. As another example, the transmission strength of RF-band challenge signals 1/2 and 2/2 may be configured to change among three or more levels.

The third embodiment provides the configuration in which the vehicular device 10 determines the received signal strength of a response signal transmitted from the portable device 20. For example, the disclosure may be configured to transmit several response signals from the portable device 20 to change transmission strengths and determine the received signal strength of the response signal transmitted from the portable device 20 based on relative signal reception strengths of the response signals.

While the disclosure has been described with reference to preferred embodiments thereof, it is to be understood that the disclosure is not limited to the preferred embodiments and constructions. The disclosure is intended to cover various modification and equivalent arrangements. In addition, while the various combinations and configurations, which are preferred, other combinations and configurations, including more, less or only a single element, are also within the spirit and scope of the disclosure.

What is claimed is:

1. A control system comprising:
a vehicular device equipped to a vehicle; and
a portable device carried by a user, wherein
the vehicular device includes an RF signal transmitting unit
sequentially transmitting a plurality of RF signal segments included in an RF signal in synchronization with an RF clock signal after a transmission of an LF signal, the RF clock signal having an RF-band frequency which is higher than a frequency of the LF signal, and
setting a first transmission time interval based on the RF clock signal, the first transmission time interval being set from a transmission completion of a first RF signal segment from the plurality of RF signal segments, and a transmission completion of a last RF signal segment from the plurality of RF signal segments,
the portable device includes:
an RF transceiving unit receiving the RF signal;
a transmission time interval determination unit counting a time period from a completion of receiving the first RF signal segment to a completion of receiving the last RF signal segment by the RF transceiving unit, the time period being substantially equal to the first transmission time interval and determining, based on the first transmission time interval, a second transmission time interval of a response signal to be transmitted in response to the RF signal that is received; and
a response signal transmitting unit controlling the RF transceiving unit to transmit the response signal at the second transmission time interval determined by the transmission time interval determination unit, and
the vehicular device further includes:
a determination unit determining whether a duration time from a transmission of one of the LF signal or the RE signal to a reception of the response signal is within an appropriate range that is set based on the RF clock signal; and
a permission unit permitting a predetermined manipulation to the vehicle when the determination unit determines that the duration time is within the appropriate range.

2. The control system according to claim 1, wherein
the RF transceiving unit of the portable device is provided by a transceiver integrated circuit which implements an RF transmitting unit that transmits RF signals and an RF receiving unit that receives RF signals on a single chip, and each of the RF transmitting unit and the RF receiving unit operates in synchronization with an RF clock signal generated by a crystal oscillator.

3. The control system according to claim 1, wherein
the RF signal transmitting unit changes transmission strengths of the plurality of RF signal segments in stepwise manner, and includes information indicating the transmission strengths of the plurality of RF signal segments in the plurality of RF signal segments before transmitting the plurality of RF signal segments,
the portable device further includes:
a received signal strength measuring unit measuring received signal strengths of the plurality of RF signal segments which are received by the RF transceiving unit; and
a received signal strength determination unit determining whether the received signal strengths of the plurality of RF signal segments satisfy a predetermined rule based on the received signal strengths of the plurality of RF signal segments and the information indicating the transmission strengths of the plurality of RF signal segments included in the plurality of RF signal segments, and
the portable device forbids a transmission of the response signal when the received signal strength determination unit determines that the received signal strengths of the plurality of RF signal segments do not satisfy the predetermined rule.

4. The control system according to claim 1, wherein
the RF signal transmitting unit changes transmission strengths of the plurality of RE signal segments in stepwise manner, and includes information indicating the transmission strengths of the plurality of RF signal segments in the plurality of RF signal segments before transmitting the plurality of RF signal segments,
the portable device further includes:
a received signal strength measuring unit measuring received signal strengths of the plurality of RF signal segments which are received by the RF transceiving unit; and a transmission strength determination unit determining a transmission strength of the response signal based on the received signal strengths of the plurality of RF signal segments, the response signal transmitting unit transmits the response signal at the transmission strength determined by the transmission strength determination unit, the vehicular device further includes a received signal strength measuring unit measuring a received signal strength of the response signal, and the permission unit forbids the predetermined manipulation to the vehicle when the received signal strength of the response signal does not satisfy a predetermined rule.

* * * * *